(12) United States Patent
Yagi et al.

(10) Patent No.: US 7,338,999 B2
(45) Date of Patent: Mar. 4, 2008

(54) RUBBER COMPOSITION FOR TIRE TREAD AND PNEUMATIC TIRE USING THE SAME

(75) Inventors: Noriko Yagi, Kobe (JP); Kiyoshige Muraoka, Kobe (JP)

(73) Assignee: Sumitomo Rubber Industries, Inc., Kobe-shi (JP)

( * ) Notice: Subject to any disclaimer, the term of this patent is extended or adjusted under 35 U.S.C. 154(b) by 0 days.

(21) Appl. No.: 10/145,146

(22) Filed: May 15, 2002

(65) Prior Publication Data

US 2003/0004249 A1 Jan. 2, 2003

(30) Foreign Application Priority Data

| May 15, 2001 | (JP) | ............................ 2001-144763 |
| Aug. 10, 2001 | (JP) | ............................ 2001-243955 |
| Oct. 22, 2001 | (JP) | ............................ 2001-323877 |

(51) Int. Cl.
*C08K 3/36* (2006.01)
*C08K 3/04* (2006.01)
*C08K 3/22* (2006.01)

(52) U.S. Cl. .................. 524/493; 524/424; 524/425; 524/430; 524/442; 524/445; 524/447; 524/448; 524/449; 524/450; 524/451; 524/495; 524/496

(58) Field of Classification Search ............... 524/495, 524/496, 493, 424, 425, 430, 442, 445, 447, 524/448, 450, 449, 451
See application file for complete search history.

(56) References Cited

U.S. PATENT DOCUMENTS

| 5,580,919 A | 12/1996 | Agostini et al. | |
| 6,075,092 A * | 6/2000 | Nakamura et al. | 525/122 |
| 6,242,522 B1 * | 6/2001 | Ezawa et al. | 524/437 |
| 6,313,205 B1 * | 11/2001 | Chiron et al. | 524/262 |
| 6,489,389 B1 * | 12/2002 | Ohta et al. | 524/437 |

FOREIGN PATENT DOCUMENTS

| EP | 0994150 A1 | 4/2000 |
| EP | 1 000 960 A1 | 5/2000 |
| EP | 1 052 270 A1 | 11/2000 |
| EP | 1 160 279 A1 | 12/2001 |
| EP | 1 172 406 A2 | 1/2002 |
| GB | 721415 | 1/1955 |
| JP | 7-133375 | 5/1995 |
| JP | 7-149954 | 6/1995 |
| JP | 8-003373 | 1/1996 |
| JP | 8-059893 | 3/1996 |
| JP | 8-059894 | 3/1996 |
| JP | 8-259739 A | 10/1996 |
| JP | 8-311245 | 11/1996 |
| JP | 9-031250 | 2/1997 |
| JP | 11-181155 A | 7/1999 |
| JP | 2000-119400 A | 4/2000 |
| JP | 2000-159932 A | 6/2000 |
| JP | 2000-80204 A | 3/2003 |
| WO | WO-00/77087 A1 | 12/2000 |

* cited by examiner

*Primary Examiner*—Tae H Yoon
(74) *Attorney, Agent, or Firm*—Birch, Stewart, Kolasch & Birch, LLP

(57) ABSTRACT

To provide a rubber composition having excellent wet grip performance while maintaining low heat build-up characteristics without lowering processability, abrasion resistance and rolling resistance. The rubber composition of the present invention comprises, based on 100 parts by weight of a diene rubber (A), 5 to 150 parts by weight of particular inorganic filler (B), 5 to 150 parts by weight of carbon black (C) having a nitrogen adsorption specific surface area of 70 to 300 $m^2/g$, and 1 to 20 % by weight of a silane coupling agent (D). The pneumatic tire of the present invention is obtained by using the rubber composition for the tread rubber.

12 Claims, No Drawings

RUBBER COMPOSITION FOR TIRE TREAD AND PNEUMATIC TIRE USING THE SAME

BACKGROUND OF THE INVENTION

The present invention relates to a rubber composition for tire tread and a pneumatic tire using the same. More specifically, the present invention relates to a rubber composition for tire tread having remarkably improved grip performance on wet road while maintaining processability and fuel efficiency, and a pneumatic tire using the rubber composition for the tread rubber.

In recent years, a wide variety of properties such as steering stability, abrasion resistance, riding comfort characteristics as well as fuel efficiency have been required for automobile tires and various ideas are suggested in order to improve these performances.

For example, it is tried to improve grip performance on road for the purpose of improving controllability and steering stability on wet road at high-speed running, or to improve cornering properties by increasing block stiffness of tire tread pattern and then preventing block deformation in case of cornering. It is also devised to inhibit deformation of groove so that excellent drainage is achieved to prevent hydroplaining.

Recently, grip performance on wet road is increased by compounding silica to a high styrene-content styrene-butadiene rubber (SBR) in order to meet the demand for such properties.

However, it is said that the above rubber composition for tire tread cannot exhibit sufficient grip performance on wet road or semi-wet road in high temperature range of over 15° C., though the grip performance can be increased in low temperature range of at most 15° C. Furthermore, it has been found that when running is carried on, the rubber composition containing silica shows decrease of rubber rigidity, resulting in remarkable decrease of grip performance. In addition, when dispersion of silica particles into rubber is insufficient, Mooney viscosity of the rubber composition is increased, causing problems that processability such as extrusion is poor.

In order to solve these problems, various suggestions have been made so far. For example, there are a rubber composition obtained by compounding sintered clay to a diene rubber; a rubber composition obtained by compounding vulcanized rubber powder comprising a diene rubber and kaolinite to a particular diene rubber; a rubber composition obtained by compounding an inorganic filler of a particular composition and carbon black to SBR containing a particular amount of styrene; and a rubber composition obtained by compounding clay comprising kaolinite as a main component to a diene rubber whose 1,2-bond content in butadiene part is in a particular range. It is now known that these rubber compositions have an effect on improvement of grip performance.

However, at present, no rubber composition has yet been produced, which has excellent wet grip performance while maintaining low heat build-up characteristics without lowering of processability and abrasion resistance.

In addition, both grip performance and rolling resistance (fuel efficiency) are properties related to hysteresis loss of a rubber. Generally, the larger the hysteresis loss is, the higher the grip performance is and the more improved the controllability is, but rolling resistance is increased at the same time, resulting in increase of fuel consumption.

In this way, grip performance and rolling resistance are incompatible, and therefore various rubber compositions for tire are suggested in order to achieve both properties simultaneously. For example, since polymers and carbon black have particular influence on both properties in the rubber composition for tire, it is tried to improve both the rolling resistance and the grip performance by suitably selecting the rate of combined styrene and the 1,2-bond content of butadiene part when a styrene-butadiene copolymer is used as a polymer. And in case of carbon black, the amount of carbon black is reduced or the particle diameter of carbon black is enlarged. In these methods, however, it is difficult to achieve compatibility between low heat build-up characteristics and reinforcing property, and abrasion resistance. Accordingly, carbon black whose activity degree of particle surface is optimized is used at present.

On the other hand, there are many reports on the method of using silica and a silane coupling agent in order to achieve low heat build-up characteristics. However, it has been found that, when running is carried on, the rubber composition containing silica shows decrease of rubber rigidity, resulting in remarkable decrease of grip performance. In addition, when dispersion of silica particles into rubber is insufficient, the rubber composition containing silica has increased Mooney viscosity, causing a problem that processability such as extrusion is poor.

For solving these problems, various suggestions have been made so far. For example, Japanese Unexamined Patent Publication Nos. 133375/1995 and 311245/1996 disclose a rubber composition obtained by compounding sintered clay to a diene rubber, Japanese Unexamined Patent Publication No. 3373/1996 discloses a rubber composition obtained by compounding a vulcanized rubber powder comprising a diene rubber and kaolinite to a particular diene rubber, describing effect on improvement of grip performance and the like. Moreover, Japanese Unexamined Patent Publication Nos. 59893/1996 and 59894/1996 disclose a rubber composition obtained by compounding an inorganic filler of a particular composition and carbon black to SBR containing a particular amount of styrene, while Japanese Unexamined Patent Publication Nos. 149954/1995 and 31250/1997 disclose a rubber composition obtained by compounding clay comprising kaolinite as a main component to a diene rubber whose 1,2-bond content in butadiene part is in a particular range, and similar effect is described.

In spite of these efforts, surface properties of inorganic fillers such as silica have a significant influence on rubber composition and often prevent the intended performance from being achieved to a remarkable degree. For example, since a silanol group, i.e., the surface functional group of silica forms a hydrogen bond, silica particles tend to coagulate with each other, causing problems such as lowering of mechanical strength and weakening of materials as well as remarkable decrease of workability.

In order to solve these problems, it has been tried to use various coupling agents, dispersion agents or surface modifiers. For example, it is considered that a sliane coupling agent combines to silanol group on the silica surface to prevent silica particles from coagulating with each other, resulting in improvement of processability. However, silane coupling agents are expensive, and can combine to some limited kinds of inorganic compounds such as silica, glass fiber and alumina owing to the characteristics of its functional group, and there has been a problem that the silane coupling agent is not effective for poorly reactive compounds such as titanium oxide, calcium carbonate, carbon black and graphite.

Other inexpensive dispersion agents or surfactants for inorganic compounds include an anionic, cationic or nonionic low molecular weight surfactant and fatty acid, but they have a problem that covering ability for inorganic compound is poor.

As mentioned above, the fact is that there is no rubber composition at present, which has excellent wet grip performance and improved dispersability of inorganic fillers while maintaining abrasion resistance and low heat build-up characteristics without lowering of workability and processability.

SUMMARY OF THE INVENTION

The present invention relates to a rubber composition for tire tread comprising, based on 100 parts by weight of a diene rubber (A), 5 to 150 parts by weight of an inorganic filler (B) represented by the following formula (I):

$$kM^1 \cdot xSiO_y \cdot zH_2O \qquad (I)$$

in which $M^1$ is at least one metal, one oxide thereof or one hydroxide thereof, said metal being selected from the group consisting of Al, Mg, Ti and Ca, k is an integer of 1 to 5, x is an integer of 0 to 10, y is an integer of 2 to 5 and z is an integer of 0 to 10, 5 to 150 parts by weight of carbon black (C) having nitrogen adsorption specific surface area of 70 to 300 $m^2/g$, and a silane coupling agent (D).

It is preferable that the rubber composition further comprises 1 to 15 parts by weight of silica (E) having nitrogen adsorption specific surface area of 100 to 300 $m^2/g$.

It is preferable that the amount of silane coupling agent (D) is 1 to 20% by weight based on the total weight of the inorganic filler (B) and silica (E).

It is preferable that the rubber composition further comprises 5 to 100 parts by weight of silica (E) having nitrogen adsorption specific surface area of 100 to 300 $m^2/g$.

It is preferable that the amount of silane coupling agent (D) is 1 to 20% by weight based on the weight of silica (E).

It is preferable that the silane coupling agent is a silane coupling agent represented by the following formula (II):

$$(C_nH_{2n+1}O)_3-Si-(CH_2)_m-S_1-(CH_2)_m-Si-(OC_nH_{2n+1})_3 \qquad (II)$$

wherein n is an integer of 1 to 3, m is an integer of 1 to 4 and 1 is the number of sulfur atoms in the polysulfide part, the average of 1 being from 2.1 to 3.5.

It is preferable that the rubber composition further comprises, based on the weight of the inorganic filler, 0.1 to 150% by weight of a polyether compound (F) represented by the following formula (III):

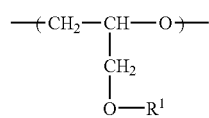

(III)

wherein $R^1$ is a hydrogen atom or a substituent selected from the group consisting of a hydrocarbon group having 1 to 50 carbon atoms, a siloxy silyl propyl group having 1 to 50 silicon atoms and a group represented by the formula $-(AO)_m-R^2$, and $R^1$ may be one kind or different kinds; and in the formula, $R^2$ is hydrogen atom or a substituent selected from the group consisting of a hydrocarbon group having 1 to 42 carbon atoms and a siloxy sillyl propyl group having 1 to 40 silicon atoms, A is an alkylene group having 2 to 3 carbon atoms, m is an integer of 1 to 100 and A, the number of which is represented by m, may be the same or different.

It is preferable that the rubber composition is obtained by simultaneous kneading at kneading temperature of 120° to 200° C.

The present invention also relates to a pneumatic tire obtained by using the rubber composition for the tread rubber.

DETAILED DESCRIPTION

The present invention is explained in detail below.

The rubber composition of the present invention comprises (A) a diene rubber, (B) an inorganic filler, (C) carbon black, and (D) a silane coupling agent.

As the diene rubber, a synthetic diene rubber or a mixed rubber comprising a diene rubber component and natural rubber can be used. Examples of the synthetic diene rubber used in the present invention include styrene-butadiene rubber (SBR), butadiene rubber (BR), isoprene rubber (IR), ethylene-propylene-diene rubber (EPDM), chloroprene rubber (CR), acrylonitrile-butadiene rubber (NBR), butyl rubber (IIR) and the like. The rubber may be used alone or in combination of two or more.

It is preferable that the rubber component contains SBR from the viewpoint of workability. The amount of SBR in the rubber component is preferably at least 20% by weight, more preferably at least 30% by weight. The styrene-butadiene rubber may be prepared by any polymerization method such as emulsion polymerization or solution polymerization.

It is preferable that the amount of styrene units contained in the SBR is 20 to 50% by weight. When the amount of styrene units is less than 20% by weight, sufficient grip performance tends not to be obtained. When the amount of the styrene unit is more than 50% by weight, abrasion resistance tends to decrease. More preferably, the upper limit of the amount of styrene units is 40% by weight and the lower limit is 25% by weight.

The inorganic filler used in the present invention is represented by the formula (I):

$$kM^1 \cdot xSiO_y \cdot zH_2O \qquad (I)$$

in which $M^1$ is at least one metal, an oxide thereof or a hydroxide thereof, said metal being selected from the group consisting of Al, Mg, Ti and Ca, k is an integer of 1 to 5, x is an integer of 0 to 10, y is an integer of 2 to 5 and z is an integer of 0 to 10.

Examples of inorganic fillers represented by the formula (I) are alumina, alumina hydrate, aluminum hydroxide, magnesium hydroxide, magnesium oxide, talc, titanium white, titanium black, calcium oxide, calcium hydroxide, magnesium aluminum oxide, clay, kaolin, pyrophillite, bentonite, aluminum silicate, magnesium silicate, calcium silicate, calcium aluminum silicate, calcium magnesium silicate and the like. The inorganic filler may be used alone or in combination of two or more. Among these, aluminum hydroxide, alumina, clay, talc and the like are preferable from the viewpoint of improving grip performance.

The average particle diameter of the inorganic filler is preferably 0.01 to 100 μm. When the average particle diameter is less than 0.01 μm, workability tends to decrease. When the average particle diameter is more than 100 μm, properties such as abrasion resistance tend to decrease. More preferably, the lower limit of the average particle diameter is 0.02 μm and the upper limit of the average particle diameter is 50 μm, particularly 10 μm, and more particularly 8 μm.

The amount of the inorganic filler is 5 to 150 parts by weight based on 100 parts by weight of the rubber component. When the amount is less than 5 parts by weight, the improvement effect on wet grip performance is small. When the amount is more than 150 parts by weight, sufficient wet grip performance cannot be obtained though abrasion resistance is decreased. Preferably, the lower limit of the amount of the inorganic filler is 10 parts by weight, and the upper limit is 120 parts by weight, particularly 100 parts by weight.

In case where the rubber composition of the present invention contains silica (E), the amount of the inorganic filler is 10 to 80% by weight based on the total amount of the inorganic filler (B), carbon black (C) and silica (E). When the amount of the inorganic filler is less than 10% by weight, the improvement effect on wet grip performance tends to be small. When the amount of the inorganic filler is more than 80% by weight, abrasion resistance tends to decrease.

The carbon black used in the present invention has a nitrogen adsorption specific area ($N_2SA$) of 70 to 300 $m^2/g$. When the $N_2SA$ of carbon black is less than 70 $m^2/g$, sufficient reinforcing property and abrasion resistance cannot be obtained. When the $N_2SA$ of carbon black is more than 300 $m^2/g$, dispersability is decreased and heat build-up characteristic is increased. The lower limit of $N_2SA$ of carbon black is preferably 90 $m^2/g$, more preferably 100 $m^2/g$. The upper limit of $N_2SA$ of carbon black is preferably 280 $m^2/g$, more preferably 250 $m^2/g$. Examples of carbon black mentioned above are HAF, ISAF, SAF and the like, but not limited thereto.

The amount of carbon black used in the present invention is 5 to 150 parts by weight based on 100 parts of the rubber component. When the amount of carbon black is less than 5 parts by weight, reinforcingproperty and abrasion resistance are decreased. When the amount is more than 150 parts by weight, not only dispersability is decreased but also desirable properties cannot be obtained. The lower limit of the amount of carbon black is preferably 10 parts by weight, more preferably 15 parts by weight. The upper limit of the amount of carbon black is preferably 120 parts by weight, more preferably 100 parts by weight, most preferably 85 parts by weight.

In case where the rubber composition of the present invention contains silica (E), the amount of carbon black (C) is 10 to 80% by weight based on the total amount of the inorganic filler (B), carbon black (C) and silica (E). When the amount of the inorganic filler is less than 10% by weight, reinforcing property and abrasion resistance tend to decrease. When the amount of the inorganic filler is more than 80% by weight, dispersability tends to decrease.

The rubber composition of the present invention may further comprise silica. Examples of silica are not particularly limited. The silica to be used is suitably selected from anhydrous silica or wet silica which have been conventionally used for the reinforcement of rubbers.

The nitrogen adsorption specific area ($N_2SA$) of silica is preferably 100 to 300 $m^2/g$. When $N_2SA$ of silica is less than 100 $m^2/g$, reinforcing effect tends to be small. When $N_2SA$ of silica is more than 300 $m^2/g$, dispersability is decreased and heat build-up characteristics of the rubber composition tends to increase. More preferably, the upper limit of $N_2SA$ of silica is 280 $m^2/g$ and the lower limit is 130 $m^2/g$.

The amount of silica (E) is preferably 1 to 15 parts by weight based on 100 parts by weight of the diene rubber (A).

When the amount of silica is less than 1 part by weight, advantage of compounding silica tends to be insufficient. When the amount is more than 15 parts by weight, processability tends to decrease. The lower limit of the amount of silica is more preferably 5 parts by weight.

The amount of silica is preferably 1 to 30% by weight based on the total amount of the inorganic filler (B), carbon black (C) and silica (E). When the amount of silica is less than 1% by weight, advantage of compounding silica tends to be insufficient. When the amount is more than 30% by weight, processability tends to decrease.

Furthermore, the amount of silica (E) is preferably 5 to 100 parts by weight based on 100 parts by weight of the rubber component. When the amount of silica is less than 5 parts by weight, sufficient wet grip performance cannot be obtained. When the amount is more than 100 parts by weight, workability tends to decrease. The lower limit is preferably 10 parts by weight, and the upper limit is preferably 80 parts by weight, more preferably 75 parts by weight.

For the silane coupling agent used in the present invention, it is possible to choose any conventional silane coupling agent which has been used in case of using silica as a filler. Concrete examples thereof are sulfide coupling agents such as bis(3-triethoxysilylpropyl)tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl)trisulfide, bis(3-trimethoxysilylpropyl) trisulfide, bis(3-triethoxysilylpropyl)disulfide, bis(3-trimethoxysilylpropyl) disulfide, 3-trimethoxysilylpropyl-N, N-dimethylthiocarbamoyltetrasulfide, 3-triethoxysilylpropyl-N, N-dimemthylthiocarbamoyltetrasulfide, 2-triethoxysilylethyl-N, N-dimethylthiocarbamoyltetrasulfide, 2-trimethoxysilylethyl-N , N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropylmethacrylatemonosulfide and 3-trimethoxysilylpropylmethacrylatemonosulfide; mercapto coupling agents such as 3-mercaptopropyltrimethoxysilane, 3-mercaptopropyltriethoxysilane, 2-mercaptoethyltrimethoxysilane and 2-mercaptoethyltriethoxysilane; vinyl coupling agents such as vinyltriethoxysilane and vinyltrimethoxysilane; amino coupling agents such as 3-aminopropyltriethoxysilane, 3-aminopropyltrimethoxysilane, 3-(2-aminoethyl) aminopropyltriethoxysilane, and 3-(2-aminoethyl)aminopropyltrimethoxysilane; glycido coupling agents such as γ-glycidoxypropyltriethoxysilane, γ-g lycidoxypropyltrimethoxysilane, γglycidoxypropylmethyldiethoxysilane and γ-glycidoxypropylmethyl dimethoxysilane; nitro coupling agents such as 3-nitropropyltrimethoxysilane and 3-nitoropropyltriethoxysilane; chloro coupling agents such as 3-chloropropyltrimethoxysilane, 3-chloropropyltriethoxysilane, 2-chloroethyltrimethoxysilane and 2-chloroethyltriethoxysilane; and the like. Among these, bis(3-triethoxysilylpropyl) tetrasulfide, 3-mercaptopropyltrimethoxysilane and the like are suitably used. The silane coupling agent may be used alone or in combination of two or more.

The amount of the silane coupling agent (D) is 1 to 20% by weight based on the total weight of the inorganic filler (B) and silica (E) in case of compounding 1 to 15 parts by weight of silica (E) based on 100parts by weight of the diene rubber (A). When the amount of the silane coupling agent is less than 1% by weight, advantage of compounding the silane coupling agent tends to be insufficient. When the amount is more than 20% by weight, the coupling effect cannot be obtained and reinforcing property as well as abrasion resistance are decreased though costs are increased. From the viewpoint of dispersion effect and coupling effect, the upper limit of the amount of the silane coupling agent is preferably 15% by weight, and the lower limit is 2% by weight.

The amount of the silane coupling agent is 1 to 20% by weight based on the weight of silica (E) in case of compounding 5 to 100 parts by weight of silica (E) based on 100 parts by weight of the diene rubber (A). When the amount of the silane coupling agent is less than 1% by weight, advantage of compounding the silane coupling agent tends to be insufficient. When the amount is more than 20% by weight, the coupling effect cannot be obtained and reinforcing property as well as abrasion resistance are decreased though costs are increased. From the viewpoint of dispersion effect and coupling effect, the upper limit of the amount of the silane coupling agent is preferably 15% by weight, and the lower limit is prefrably 2% by weight.

The silane coupling agent represented by the formula (II) is preferably used:

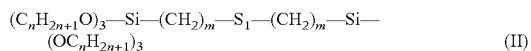

wherein n is an integer of 1 to 3, m is an integer of 1 to 4 and l is the number of sulfur atoms in the polysulfide part, the average of l being from 2.1 to 3.5, preferably from 2.1 to 3. When the average of l of the silane coupling agent is larger than 3.5, processability decreases as the kneading temperature increases.

Examples of the silane coupling agent are bis(3-triethoxysilylpropyl)polysulfide, bis(2-triethoxysilylethyl)polysulfide, bis(3-trimethoxysilylpropyl)polysulfide, bis(2-trimethoxysilylethyl)polyslufide trimethoxysilylethyl) polysulfide, bis(4-triethoxysilylbutyl)polysulfide, bis(4-trimethoxysilylbutyl)polysulfide and the like. The silane coupling agent may be used alone or in combination of two or more. Among these, bis(3-triethoxysilylpropyl)polysulfide is suitably used from the viewpoint that the effect of adding the coupling agent is balanced with the costs.

In addition, it is preferable that the rubber composition of the present invention further comprises 0.1 to 150% by weight of a polyether compound (F) represented by the following formula (III) based on the weight of the inorganic filler.

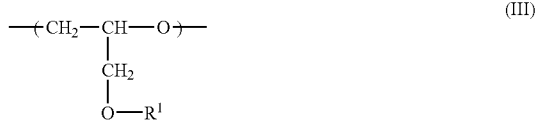

wherein $R^1$ is hydrogen atom or a substituent selected from the group consisting of a hydrocarbon group having 1 to 50 carbon atoms, a siloxy silyl propyl group having 1 to 50 silicon atoms and a group represented by the formula $-(AO)_m-R^2$, and $R^1$ may be one kind or different kinds; and in the formula, $R^2$ is hydrogen atom or a substituent selected from the group consisting of a carboxyl group having 1 to 42 carbon atoms and a siloxy sillyl propyl group having 1 to 40 silicon atoms, A is an alkylene group having 2 to 3 carbon atoms, m is an integer of 1 to 100 and A, the number of which is represented by m, may be the same or different.

When $R^1$ in the formula (III) is a hydrocarbon group, preferable examples of $R^1$ are an alkyl group or an alkenyl group having 1 to 42 carbon atoms, an aryl group having 6 to 42 carbon atoms, or an aryl alkyl group or alkyl aryl group having 7 to 43 carbon atoms. More preferable examples thereof are an alkyl group having 1 to 30 carbon atoms, such as methyl group, ethyl group, n-propyl group, isopropyl group, n-butyl group, t-butyl group, octyl group, decyl group, dodecyl group, cetyl group or stearyl group; an alkenyl group having 2 to 30 carbon atoms, such as allyl group; an aryl group having 6 to 30 carbon atoms such as phenyl group; an alkyl aryl group having 7 to 31 carbon atoms such as nonyl phenyl group and the like. When $R^1$ contains too many carbon atoms, dispersion effect and surface modification effect on the inorganic filler tend to decrease.

When $R^1$ is a siloxy silyl propyl group, preferable examples of $R^1$ are a linear or branched siloxy silyl propyl group having 1 to 30, particularly 1 to 20 silicon atoms. The alkyl substituent which binds to silicon atoms of the siloxy silyl propyl group may be the same or different, and examples thereof are methyl group, butyl group, vinyl group, phenyl group and the like.

In the above formula (III), $R^1$ may have a substituent, and examples thereof are hydroxy group, alkoxy group (having 1 to 30 carbon atoms), amino group, dimethyl amino group, diethyl amino group, amido group (having 1 to 18 carbon atoms), trialkyl ammonium group (whose alkyl group has 1 to 30 carbon atoms), dialkyl ammonium group (whose alkyl group has 1 to 30 carbon atoms), alkyl ammonium group (whose alkyl group has 1 to 30 carbon atoms), ammonium group, methyl ester group, ethyl ester group, carboxyl group, acyl group (having 1 to 18 carbon atoms), silyl group, siloxy group and the like (hereinafter referred to as "substituents of the present invention").

When $R^1$ is a group represented by the formula $-(AO)_m-R^2$ and $R^2$ is a hydrocarbon group, preferable examples of $R^2$ are methyl group, ethyl group, n-butyl group, t-butyl group, octyl group, decyl group, dodecyl group, cetyl group, stearyl group, phenyl group, nonyl phenyl group and the like.

When $R^2$ is a siloxy silyl propyl group, preferable examples of $R^2$ are a siloxy silyl propyl group having 1 to 20 silicon atoms. The alkyl substituent which binds to the silicon atom of the siloxy silyl propyl group may be the same or different, and examples thereof are methyl group, butyl group, vinyl group, phenyl group and the like.

$R^2$ may have a substituent, and examples thereof are the substituents of the present invention.

Furthermore, examples of A is ethylene group or propylene group. Preferably, m is an integer of 1 to 50, more preferably an integer of 5 to 10.

The polyether compound (III) of the present invention is obtained by polymerizing an epoxy compound represented by the formula (IV) alone or co-polymerizing the epoxy compound with another monomer (X). That is, the polyether compound (III) is obtained by either of the following reaction formulae:

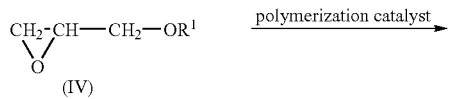

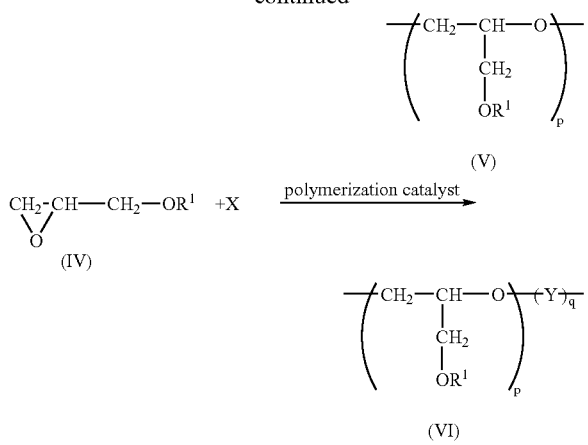

wherein $R^1$ is the same as mentioned above, X represents another monomer copolymerizable with substituted epoxide (IV), Y represents a polymerization unit derived from the monomer X and p and q represent repeating of each polymerization unit.

In these cases, p is preferably 5 to 2,000,000. When p is less than 5, the polyether compound (III) tends to have decreased covering ability for the inorganic filler. When p is more than 2,000,000, dispersability of the polyether compound itself is decreased and therefore its surface modification effect on the inorganic filler tends to decrease. More preferably, the lower limit of p is 10 and the upper limit of p is 1,000,000, particularly 100,000. In case of using X, q is not 0, and preferably 1 to 100,000.

In the polyether compounds (V) and (VI), $R^1$ may be different kinds. In that case, sequence thereof in the polyether main chain may be any of block sequence, alternate sequence or random sequence. The sequence of the polymerization unit Y in the compound (VI) may be any of block sequence, alternate sequence or random sequence.

Examples of the monomer X are an ethylene oxide, a substituted epoxide other than the substituted epoxide (IV) or an anionic polymerizable monomer other than epoxide. Preferable examples thereof are ethylene oxide, propylene oxide, alkylene oxide having 4 to 22 carbon atoms, 3-perfluoroalkyl-1,2-epoxypropane, lactones with four rings, six rings or seven rings, carbonates with five rings or six rings, lactams, hexamethylcyclotrisiloxane, octamethylcyclotetrasiloxane, (meth)acrylic acid esters such as methyl (meth) acrylate, styrene, butadiene, isoprene, end olefins having 5 to 22 carbon atoms and the like.

The amount of the polyether compound used in the present invention is preferably 0.1 to 150% by weight based on the weight of the inorganic filler. When the amount of the polyether compound is less than 0.1% by weight, there is a tendency that sufficient dispersion effect cannot be obtained. When the amount is more than 150% by weight, there is a tendency that dispersion effect cannot be obtained though the costs are increased. The lower limit of the amount of the polyether compound is more preferably 0.5% by weight. The upper limit of the amount of the polyether compound is more preferably 100% by weight, most preferably 80% by weight.

The polyether compound of the present invention may be used alone or in combination of two or more. Additionally, it is possible to use known surface modifiers, dispersion agents, surfactants, coupling agents and the like.

Other than the above agents, any agents such as softeners, antioxidants, vulcanizing agents, vulcanization accelerators and auxiliary vulcanization activators which are used in the normal rubber industry may be added if necessary.

It is preferable that the rubber composition of the present invention is obtained by kneading the above mentioned diene rubber, inorganic filler, carbon black, silane coupling agent, if necessary silica and polyether compound simultaneously at a kneading temperature of 120° to 200° C. in a mixing step. When the kneading temperature is lower than 120° C., reactivity of the silane coupling agent is low and there is a tendency that sufficient properties cannot be achieved. When the kneading temperature is more than 200° C., the rubber tends to be burned. More preferably, the upper limit of the kneading temperature is 180° C. and the lower limit is 140° C. In this step, it is preferable to carry out the kneading without vulcanization chemicals (the vulcanizing agent and the vulcanization accelerator).

In the above mixing step, kneading time is preferably 4 to 15 minutes. When the kneading time is shorter than 4 minutes, dispersion of chemicals such as carbon black tends to be insufficient. When the kneading time is longer than 15 minutes, the molecular weight of the rubber component is decreased and sufficient properties tend not to be achieved.

The tire of the present invention is prepared by a normal process using the rubber composition of the present invention. That is, the rubber composition of the present invention to which the above various chemicals are added if necessary is extruded and processed into a tread material without vulcanization; the processed material is disposed on a tire forming machine and laminated in a usual manner to form an unvulcanized tire; and the unvulcanized tire is pressheated in a vulcanizing machine to prepare a tire. The thus-obtained tire of the present invention is excellent in abrasion resistance, low heat build-up characteristics and wet grip performance and the like.

The rubber composition of the present invention has improved low heat build-up characteristics and wet grip performance without lowering processability and abrasion resistance, and can be suitably used as a rubber composition for tread.

The present invention is explained in detail based on Examples below, but not limited thereto.

Materials used in Examples and Comparative Examples are summarized below.

SBR: SBR 1502 (amount of styrene units: 23.5% by weight) available from JSR Corporation.

Carbon black: SHOBLACK N220 ($N_2SA$: 125 $m^2/g$) available from Showa Cabot Co. Ltd.

Aluminum hydroxide: Higilite H-43 available from Showa Denko K. K. (average particle diameter: 0.5 to 2 μm)

Clay: Crown Clay available from South Eastern Inc. (average particle diameter: at most 2 μm)

Silica: Ultrasil VN 3 available from Degussa Co. ($N_2SA$: 210 $m^2/g$)

Silane coupling agent A: Si69 available from Degussa Co. (average of 1: about 3.8) (bis(3-triethoxysilylpropyl)tetrasulfide)

Silane coupling agent B: Si266 available from Degussa Co. (average of 1: about 2.2) (bis(3-triethoxysilylpropyl)disulfide)

Aromatic oil: JOMO Process X140 available from Japan Energy Corporation

Antioxidant: Nocrac 6C available from Ohuchi Shinko Kagaku Kogyo Co. Ltd. (N-(1,3-dimethyl butyl)-N'-phenyl-p-phenylenediamine Stearic acid: stearic acid available from NOF Corporation Zinc oxide: Zinc Oxide No. 1 available from Mitsui Mining and Smelting Co., Ltd.

Sulfur: powdery sulfur available from Tsurumi Chemicals Co., Ltd.

Vulcanization accelerator TBBS: Nocceler NS (N-tert-butyl-2-benzothiazolylsulfenamide) available from Ohuchi Shinko Kagaku Kogyo Co. Ltd.

Vulcanization accelerator DPG: Nocceler D (N,N'-diphenylguanidine) available from Ohuchi Shinko Kagaku Kogyo Co. Ltd.

EMBODIMENT 1

EXAMPLES 1 TO 5 AND COMPARATIVE EXAMPLES 1 TO 2

Sample rubber compositions were obtained by kneading and compounding based on the compounding recipe described in Table 1. The compounds were press-vulcanized at 170° C. for 20 minutes to obtain vulcanized materials. Each of the obtained materials was subjected to the following property tests.

(Abrasion Test)

Using a Lambourne abrasion tester, the Lambourne abrasion amount was measured under the condition of 20° C., a slip ratio of 20% and testing time of 5 minutes. The volume loss of each compound was calculated and indexed to the loss of Comparative Example 1 as 100 according to the following equation (abrasion index). The larger the index is, the more excellent the abrasion resistance is.

(abrasion index)=(loss of Comparative Example 1)÷(loss of each compound)×100

(Rolling Resistance Index)

The loss tangent (tan δ) of each compound was measured by using a viscoelasticity spectrometer VES (made by Iwamoto Corporation) under the condition of 70° C., initial strain of 10% and dynamic strain of 2%. The loss tangent was indexed to tan δ of Comparative Example 1 as 100 according to the following equation (rolling resistance index). The larger the index is, the more excellent the rolling resistance is.

(rolling resistance index)=(tan δ of Comparative Example 1)÷(tan δ of each compound)×100

(Wet Skid Test)

The wet skid resistance was measured according to the method of ASTM E303-83 using a portable skid tester made by Stanley Inc. The wet skid resistance was indexed to the measured value of Comparative Example 1 as 100 based on the following equation (wet skid index). The larger the index is, the more excellent the wet skid performance is.

(wet skid index)=(wet skid resistance of each compound)÷(wet skid resistance of Comparative Example 1)×100

(Mooney Viscosity)

The Mooney viscosity was measured at 130° C. in accordance with the measuring method of JIS K6300. The Mooney viscosity was indexed to the Mooney viscosity of Comparative Example 1 ($ML_{1+4}$) as 100 based on the following equation (Mooney viscosity index). The larger the value is, the lower the Mooney viscosity is and the more excellent the processability is.

(Mooney viscosity index)=($ML_{1+4}$ of Comparative Example 1)÷($ML_{1+4}$ of each compound)

(Appearance of Rubber Surface)

The sheet condition of each compound was visually observed immediately after the knead-extrusion and evaluated based on the following criteria. The worse the sheet condition is, the lower the workability is.

○: Sheet condition is excellent

Δ: Unevenness is observed x: Sheet is damaged

The results are shown in Table 1.

TABLE 1

| | Ex. No. | | | | | Com. Ex. No. | |
|---|---|---|---|---|---|---|---|
| | 1 | 2 | 3 | 4 | 5 | 1 | 2 |
| Compound (part) | | | | | | | |
| SBR | 100 | 100 | 100 | 100 | 100 | 100 | 100 |
| Carbon black | 40 | 40 | 40 | 40 | 10 | 60 | 40 |
| Aluminum hydroxide | 20 | — | 20 | — | 10 | — | 20 |
| Clay | — | 20 | — | 20 | — | — | — |
| Silica | 5 | 5 | 10 | 10 | 60 | — | — |
| Silane coupling agent A | 2 | 2 | 2 | 2 | 5.6 | — | — |
| Aromatic oil | 8 | 8 | 8 | 8 | 15 | 15 | 15 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization Accelerator TBBS | 1 | 1 | 1 | 1 | 1 | 1 | 1 |
| Vulcanization Accelerator DPG | 0.5 | 0.5 | 0.5 | 0.5 | 0.5 | 0.5 | 0.5 |
| Properties | | | | | | | |
| Abrasion resistance index | 102 | 101 | 101 | 100 | 88 | 100 | 95 |
| Rolling resistance index | 106 | 102 | 107 | 103 | 108 | 100 | 102 |
| Wet skid index | 104 | 101 | 108 | 104 | 110 | 100 | 101 |
| Mooney viscosity index | 95 | 94 | 93 | 92 | 82 | 100 | 96 |
| Rubber face | ○ | ○ | ○ | ○ | Δ | ○ | ○ |

EMBODIMENT 2

EXAMPLES 6 TO 10 and COMPARATIVE EXAMPLES 3 TO 4

Initially, chemicals except for sulfur and the vulcanization accelerator was kneaded and compounded at 150° C. for 4 minutes based on the compounding recipe described in Table 2. Then, sulfur and the vulcanization accelerator were added thereto and the kneading and compounding were continued to obtain sample rubber compounds.

The compounds were press-vulcanized at 170° C. for 20 minutes to obtain vulcanized materials. Each of the obtained materials was subjected to the following property tests.

(Mooney Viscosity)

Evaluation was made in the same manner as in Embodiment 1 except that the Mooney viscosity of Comparative Example 3 ($ML_{1+4}$) was assumed to be 100.

(Abrasion Test)

Evaluation was made in the same manner as in Embodiment 1 except that the loss of Comparative Example 3 was assumed to be 100.

(Rolling Resistance Index)

Evaluation was made in the same manner as in Embodiment 1 except that the tan δ of Comparative Example 3 was assumed to be 100.

(Wet Skid Test)

Evaluation was made in the same manner as in Embodiment 1 except that the measured value of Comparative Example 3 was assumed to be 100.

TABLE 2

|  | Ex. No. | | | | | Com. Ex. No. | |
| --- | --- | --- | --- | --- | --- | --- | --- |
|  | 6 | 7 | 8 | 9 | 10 | 3 | 4 |
| Compound (part) | | | | | | | |
| SBR | 100 | 100 | 100 | 100 | 100 | 100 | 100 |
| Carbon black | 40 | 40 | 40 | 40 | 40 | 60 | 40 |
| Aluminum hydroxide | 20 | — | 20 | — | 20 | — | 20 |
| Clay | — | 20 | — | 20 | — | — | — |
| Silica | — | — | 5 | 5 | — | — | — |
| Silane coupling agent A | — | — | — | — | 2 | — | — |
| Silane coupling agent B | 2 | 2 | 2 | 2 | — | — | — |
| Aromatic oil | 8 | 8 | 8 | 8 | 8 | 15 | 15 |
| Antioxidant | 1 | 1 | 1 | 1 | 1 | 1 | 1 |
| Stearic acid | 2 | 2 | 2 | 2 | 2 | 2 | 2 |
| Zinc oxide | 3 | 3 | 3 | 3 | 3 | 3 | 3 |
| Sulfur | 1.7 | 1.7 | 1.7 | 1.7 | 1.5 | 1.5 | 1.5 |
| Vulcanization Accelerator TBBS | 1 | 1 | 1 | 1 | 1 | 1 | 1 |
| Vulcanization Accelerator DPG | 0.5 | 0.5 | 0.5 | 0.5 | 0.5 | 0.5 | 0.5 |
| Properties | | | | | | | |
| Mooney viscosity index | 113 | 108 | 102 | 100 | 65 | 100 | 89 |
| Abrasion resistance index | 104 | 101 | 103 | 101 | 99 | 100 | 95 |
| Rolling resistance index | 107 | 103 | 109 | 104 | 103 | 100 | 102 |
| Wet skid index | 106 | 103 | 109 | 105 | 102 | 100 | 101 |

EMBODIMENT 3

Polyether compounds were synthesized according to the following Preparation Examples. The molecular weight of the synthesized polyether compounds was measured according to GPC using a measuring machine type 150C made by Waters Inc. and two columns Shodex HT-806 and Shodex HT-803 available from Showa Denko K. K. (column temperature: 130° C., moving phase: o-dichlorobenzene). The molecular weight of the synthesized polyether compound was determined as the number average molecular weight (hereinafter referred to as Mn) converted to a polystyrene basis.

PREPARATION EXAMPLE 1

(Polyether Compound 1)

In toluene, 50 g of stearyl glycidyl ether was polymerized at 130° C. for 12 hours by using samarium alkoxide-methyl almoxane catalyst in an amount of 1% by mole (based on glycidyl ether, and so forth). The reaction mixture was purified by reprecipitation and white solid polyether compound 1 was obtained. The obtained compound was a modifying agent having a higher alkyl group in the side chain. The compound had a Mn of 290,000. The structure of the compound is shown below:

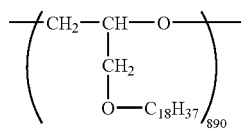

PREPARATION EXAMPLE 2

(Polyether Compound 2)

Light yellow solid polyether compound 2 was obtained in the same manner as in Preparation Example 1 except for using 40 g of stearyl glycidyl ether and 10 g of phenyl glycidyl ether instead of 50 g of stearyl glycidyl ether. The obtained compound was a modifying agent having a higher alkyl group and a phenyl group in the side chain. The compound had a Mn of 270,000. The structure of the compound is shown below:

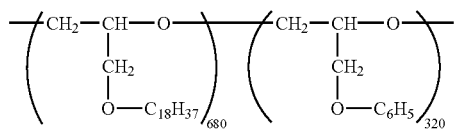

PREPARATION EXAMPLE 3

(Polyether Compound 3)

White solid polyether compound 3 was obtained in the same manner as in Preparation Example 1 except for using 40 g of stearyl glycidyl ether and 10 g of allyl glycidyl ether instead of 50 g of stearyl glycidyl ether. The obtained compound was a modifying agent having a higher alkyl group and an allyl group in the side chain. The compound had a Mn of 260,000. The structure of the compound is shown below:

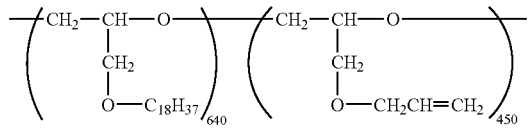

PREPARATION EXAMPLE 4

(Polyether Compound 4)

A colorless and transparent soft polymer, i.e., polyether compound 4 was obtained in the same manner as in Preparation Example 1 except for using 40 g of n-butyl glycidyl ether and 10 g of allyl glycidyl ether instead of 50 g of stearyl glycidyl ether. The obtained compound was a modifying agent having a butyl group and an allyl group in the side chain. The compound had a Mn of 130,000. The structure of the compound is shown below:

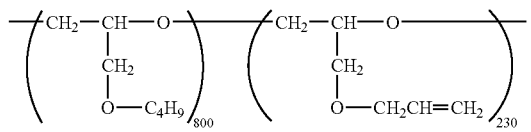

EXAMPLES 11 TO 20 AND COMPARATIVE EXAMPLES 5 TO 12

Sample rubber compositions were obtained by kneading and compounding based on the compounding recipe described in Tables 3 and 4. The compounds were press-vulcanized at 170° C. for 20 minutes to obtain vulcanized materials. Each of the obtained materials was subjected to the following property tests.

(Abrasion Test)

Evaluation was made in the same manner as in Embodiment 1 except that the loss of Comparative Example 5 was assumed to be 100.

(Rolling Resistance Index)

Evaluation was made in the same manner as in Embodiment 1 except that the tan δ of Comparative Example 5 was assumed to be 100.

(Wet Skid Test)

Evaluation was made in the same manner as in Embodiment 1 except that the measured value of Comparative Example 5 was assumed to be 100.

The results are shown in Tables 3 and 4.

TABLE 3

| | Ex. No. | | | | | | Com. Ex. No. | | | |
|---|---|---|---|---|---|---|---|---|---|---|
| | 11 | 12 | 13 | 14 | 15 | 16 | 5 | 6 | 7 | 8 |
| Compound (part) | | | | | | | | | | |
| SBR | 100 | 100 | 100 | 100 | 100 | 100 | 100 | 100 | 100 | 100 |
| Carbon black | 30 | 30 | 30 | 30 | 40 | 30 | 60 | 40 | 40 | 40 |
| Silica | 10 | 10 | 10 | 10 | — | 10 | — | 20 | — | — |
| Silane coupling agent A | 1 | 1 | 1 | 1 | 2 | 1 | — | 2 | — | — |
| Aluminum hydroxide | 20 | 20 | 20 | 20 | 20 | 20 | — | — | 20 | 20 |
| Clay | — | — | — | — | — | — | — | — | — | — |
| Polyether compound 1 | 0.5 | — | — | — | — | — | — | — | — | — |
| Polyether compound 2 | — | 0.5 | — | — | — | — | — | — | — | — |
| Polyether compound 3 | — | — | 0.5 | — | — | — | — | — | — | — |
| Polyether compound 4 | — | — | — | 0.5 | — | — | — | — | — | — |
| Aromatic oil | 8 | 8 | 8 | 8 | 8 | 8 | 15 | 15 | 8 | 8 |
| Antioxidant | 1 | 1 | 1 | 1 | 1 | 1 | 1 | 1 | 1 | 1 |
| Stearic acid | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Properties | | | | | | | | | | |
| Vulcanization Accelerator TBBS | 1 | 1 | 1 | 1 | 1 | 1 | 1 | 1 | 1 | 1 |
| Vulcanization Accelerator DPG | 0.5 | 0.5 | 0.5 | 0.5 | 0.5 | 0.5 | 0.5 | 0.5 | 0.5 | 0.5 |
| Abrasion resistance index | 100 | 103 | 101 | 102 | 93 | 96 | 100 | 96 | 88 | 90 |
| Rolling resistance index | 113 | 117 | 114 | 115 | 111 | 112 | 100 | 108 | 109 | 110 |
| Wet skid index | 117 | 123 | 119 | 120 | 111 | 115 | 100 | 103 | 109 | 113 |

TABLE 4

| | Ex. No. | | | | Com. Ex. No. | | | | | |
|---|---|---|---|---|---|---|---|---|---|---|
| | 17 | 18 | 19 | 20 | 5 | 6 | 9 | 10 | 11 | 12 |
| Compound (part) | | | | | | | | | | |
| SBR | 100 | 100 | 100 | 100 | 100 | 100 | 100 | 100 | 100 | 100 |
| Carbon black | 30 | 30 | 30 | 30 | 60 | 40 | 40 | 40 | 40 | 30 |
| Silica | 10 | 10 | 10 | 10 | — | 20 | — | — | — | 10 |
| Silane coupling agent A | 1 | 1 | 1 | 1 | — | 2 | — | 2 | — | 1 |
| Aluminum hydroxide | — | — | — | — | — | — | — | — | — | — |
| Clay | 20 | 20 | 20 | 20 | — | — | 20 | 20 | 20 | 20 |
| Polyether compound 1 | 0.5 | — | — | — | — | — | — | — | — | — |
| Polyether compound 2 | — | 0.5 | — | — | — | — | — | 0.5 | — | — |
| Polyether compound 3 | — | — | 0.5 | — | — | — | — | — | — | — |
| Polyether compound 4 | — | — | — | 0.5 | — | — | — | — | — | — |
| Aromatic oil | 8 | 8 | 8 | 8 | 15 | 15 | 8 | 8 | 8 | 8 |
| Antioxidant | 1 | 1 | 1 | 1 | 1 | 1 | 1 | 1 | 1 | 1 |
| Stearic acid | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Vulcanization Accelerator TBBS | 1 | 1 | 1 | 1 | 1 | 1 | 1 | 1 | 1 | 1 |
| Vulcanization Accelerator DPG | 0.5 | 0.5 | 0.5 | 0.5 | 0.5 | 0.5 | 0.5 | 0.5 | 0.5 | 0.5 |

TABLE 4-continued

|  | Ex. No. | | | | Com. Ex. No. | | | | | |
| --- | --- | --- | --- | --- | --- | --- | --- | --- | --- | --- |
|  | 17 | 18 | 19 | 20 | 5 | 6 | 9 | 10 | 11 | 12 |
| Properties |  |  |  |  |  |  |  |  |  |  |
| Abrasion resistance index | 100 | 103 | 100 | 102 | 100 | 96 | 85 | 90 | 88 | 90 |
| Rolling resistance index | 112 | 115 | 112 | 113 | 100 | 108 | 108 | 110 | 109 | 110 |
| Wet skid index | 113 | 116 | 113 | 114 | 100 | 103 | 106 | 108 | 109 | 112 |

Table 3 shows that the rubber composition of Comparative Example 6 obtained by compounding silica instead of part of carbon black together with a silane coupling agent has inferior reinforcing property and decreased abrasion resistance though low heat build-up characteristics and grip performance thereof are improved.

It is found that the rubber composition of Comparative Example 7 obtained by compounding aluminum oxide instead of part of carbon black, and the rubber composition of Comparative Example 8 obtained by aluminum oxide instead of part of carbon black together with a polyether compound have inferior reinforcing property and decreased abrasion resistance as well, though low heat build-up characteristics and grip performance thereof are improved.

On the other hand, as to the rubber compositions of Examples 11 to 14 obtained by compounding silica and aluminum oxide instead of part of carbon black together with a silane coupling agent and a polyether compound, improvement of low heat build-up characteristics and grip performance was achieved without lowering abrasion resistance.

Table 4 shows that the rubber composition of Comparative Example 9 obtained by compounding clay instead of part of carbon black, the rubber compositions of Comparative Examples 10 to 12 obtained by compounding clay instead of part of carbon black together with a silane coupling agent, a polyether compound, or silica and a silane coupling agent, respectively, have inferior reinforcing property and decreased abrasion resistance though low heat build-up characteristics and grip performance thereof are improved.

On the other hand, as to the rubber compositions of Examples 17 to 20 obtained by compounding silica and clay instead of part of carbon black together with a silane coupling agent and a polyether compound, improvement of low heat build-up characteristics and grip performance was achieved without lowering abrasion resistance.

According to the present invention, it is possible to produce a rubber composition having excellent processability, abrasion resistance, low heat build-up characteristics, rolling resistance and wet skid performance, and a pneumatic tire using the same.

In addition, since a silane coupling agent having less sulfur atoms in the sulfide part is compounded to the rubber composition of the present invention, there is no problem that the Mooney viscosity is increased to decrease processability even at high temperature kneading.

What is claimed is:

1. A rubber composition for tire tread comprising, based on 100 parts by weight of a diene rubber (A),
   (i) 5 to 100 parts by weight of inorganic filler (B) represented by the following formula (I):

$$kM^1 \cdot xSiO_y \cdot zH_2O \quad \text{(I)}$$

in which $M^1$ is at least one metal, one oxide thereof or one hydroxide thereof, said metal being selected from the group consisting of Al, Mg, Ti and Ca, k is an integer of 1 to 5, x is an integer of 0 to 10, y is an integer of 2 to 5 and z is an integer of 0 to 10,
   (ii) 15 to 85 parts by weight of carbon black (C) having nitrogen adsorption specific surface area of 70 to 300 $m^2/g$,
   (iii) 1 to 10 parts by weight of silica (E) having nitrogen adsorption specific surface area of 100 to 300 $m^2/g$,
   (iv) based on the weight of the inorganic filler (B), 0.1 to 150% by weight of a polyether compound (F) represented by the following formula (III):

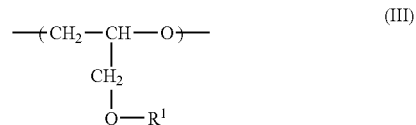

(III)

wherein $R^1$ is a hydrogen atom or a substituent selected from the group consisting of a hydrocarbon group having 1 to 50 carbon atoms, a siloxy silyl propyl group having 1 to 50 silicon atoms and a group represented by the formula $-(AO)_m-R^2$, and $R^1$ may be one kind or different kinds; and in the formula, $R^2$ is a hydrogen atom or a substituent selected from the group consisting of a hydrocarbon group having 1 to 42 carbon atoms and a siloxy silyl propyl group having 1 to 40 silicon atoms, A is an alkylene group having 2 to 3 carbon atoms, m is an integer of 1 to 100 and A, the number of which is represented by m, may be the same or different; and
   (v) a silane coupling agent (D).

2. The rubber composition for tire tread of claim 1, wherein the amount of the silane coupling agent (D) is 1 to 20% by weight based on the total weight of the inorganic filler (B) and silica (E).

3. The rubber composition for tire tread of claim 1, wherein the silane coupling agent is a silane coupling agent represented by the following formula (II):

$$(C_{2n+1}O)_3-Si-(CH_2)_m-S_1-(CH_2)_m-Si-(OC_nH_{2n+})_3 \quad \text{(II)}$$

wherein n is an integer of 1 to 3, m is an integer of 1 to 4 and 1 is the number of sulfur atoms in the polysulfide part, an average of 1 being a positive number of 2.1 to 3.5.

4. The rubber composition for tire tread of claim 1 obtained by simultaneous kneading at kneading temperature of 120° to 200° C.

5. A pneumatic tire obtained by using the rubber composition of claim 1 for the tread rubber.

6. The rubber composition for tire tread of claim 1, wherein the inorganic filler (B) is selected from the group consisting of alumina, alumina hydrate, aluminum hydroxide, magnesium hydroxide, magnesium oxide, talc, titanium white, titanium black, calcium oxide, calcium hydroxide, magnesium aluminum oxide, clay, kaolin, pyrophillite, bentonite, aluminum silicate, magnesium silicate, calcium silicate, calcium aluminum silicate, and calcium magnesium silicate.

7. The rubber composition for tire tread of claim 1, wherein the inorganic filler (B) has an average particle diameter of 0.01 to 100 µm.

8. The rubber composition for tire tread of claim 1, wherein the nitrogen adsorption specific surface are of the carbon black (C) is 90 to 280 m²/g.

9. The rubber composition for tire tread of claim 1, wherein the nitrogen adsorption specific surface are of the carbon black (C) is 100 to 250 m²/g.

10. The rubber composition for tire tread of claim 1, wherein the nitrogen adsorption specific surface are of the silica (E) is 130 to 280 m²/g.

11. The rubber composition for tire tread of claim 1, wherein the silane coupling agent (D) is selected from the group consisting of bis(3-triethoxysilylpropyl)tetrasulfide, bis(2-triethoxysitylethyt)tetrasulfide bis(3-trimethoxysilylpropyl)tetrasulfide, bis(2-trimethoxysilylethyl)tetrasulfide bis(3-triethoxysilylpropyl)trisulfide, bis(3-trimethoxysilylpropyl)trisulfide bis(3-triethoxysilylpropyl)disulfide, bis(3-trimethoxysilylpropyl)disulfide,3-trimethoxysilylpropyl-N,N-dimethylthiocarbamoyltetrasulfide, 3-triethoxysilylpropyl-N,N-dimemthyltbiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide,3-trimethoxysilylpropylbenzothiazolyltetrasulfide, 3-triethoxysilylpropylbenzothiazol-tetrasulfide, 3-triethoxysilylpropylmethacrylatemonosulfide,3-trimethoxysilylpropylmethacrylatemonosulfide, 3-mercaptopropyltrimethoxysilane,3-mercaptopropyltriethoxysilane, 2-mercaptoethyltrimethoxysilane,2-mercaptoethyltriethoxysilane, vinyltriethoxysilane and vinyltrimethoxysilane,3-aminopropyltriethoxysilane,3-aminopropyltrimethoxysilane, 3-(2-aminoethyl)aminopropyltriethoxysilane,3-(2-aminoethyl)aminopropyltrimethoxysilane, γ-glycidoxypropyltriethoxysilane γ-glycidoxypropyltrimethoxysilane, γ-glycidoxypropylmethyldiethoxysilane,γ-glycidoxypropylmethyldimethoxysilane, 3-nitropropyltrimethoxysilane,3-nitoropropyltriethoxysilane,3-chloropropyltrimethoxysilane, 3-chloropropyltriethoxysilane,2-chloroethyltrimethox-ysilane and 2-chloroethyltriethoxysilane.

12. The rubber composition for a tire tread according to claim 1, wherein silica (E) is present in an amount of 10 parts by weight and the polyether compound (F) is present in am amount of 0.5 part by weight.

* * * * *